United States Patent
Takada

Patent Number: 6,123,131
Date of Patent: Sep. 26, 2000

[54] HEAVY-DUTY RADIAL TIRE WITH SPECIFIED UPPER SIDE WALL PROFILE

[75] Inventor: Yoshiyuki Takada, Kobe, Japan

[73] Assignee: Sumitomo Rubber Company, Hyogo-ken, Japan

[21] Appl. No.: 09/349,495

[22] Filed: Jul. 9, 1999

[30] Foreign Application Priority Data

Jul. 10, 1998 [JP] Japan .................................. 10-195334

[51] Int. Cl.[7] .............................. B60C 3/00; B60C 13/02
[52] U.S. Cl. ............................................ 152/454; 152/523
[58] Field of Search ..................................... 152/454, 523, 152/209.16

[56] References Cited

U.S. PATENT DOCUMENTS 5,211,780 5/1993 Kabe et al. .......................... 152/523 X

*Primary Examiner*—Adrienne C. Johnstone

[57] ABSTRACT

A heavy duty radial tire is provided between the tread edge and the maximum tire width point with a profile which is formed by adding at least a protrusion to a basic profile, the basic profile consisting of an upper line and a lower line, the upper line extending radially inwardly from the tread edge and curved concavely so as to have a center of curvature outside the tire, the lower line extending radially outwardly from the maximum tire width point and curved convexly so as to have a center of curvature inside the tire, the upper line and lower line intersecting each other so as to form an inflection point, the radial height of the inflection point from the bead base line being in the range of from 0.82 to 0.88 times a groove bottom line height, the groove bottom line height being the radial height between the bead base line and a groove bottom line drawn parallel with the tread surface at the depth of the main grooves measured at axial ends of the groove bottom line, and the protrusion having an apex positioned such that the axial distance measured axially outwardly from the inflection point to the apex is in the range of from 4 to 8 mm, and the radial distance measured between the inflection point and the apex is in the range of from 0 to 5 mm, whereby the resistance to carcass damage can be improved if the carcass is minimized.

4 Claims, 3 Drawing Sheets

HEAVY-DUTY RADIAL TIRE WITH SPECIFIED UPPER SIDE WALL PROFILE

BACKGROUND OF THE INVENTION

Fielf of the Invention

The present invention relates to a heavy-duty radial tire having an improved carcass structure and upper sidewall profile capable of reducing the tire weight without decreasing the resistance to carcass damage.

In recent years, even in heavy-duty radial tires for heavy-duty vehicles such as trucks, dump trucks, buses and the like, in order to reduce the tire weight, consumed materials, manufacturing cost and the like, every effort has been made. Thus, as to the carcass of heavy-duty radial tires, the number of carcass plies, cord count and cord thickness are decreased while maintaining a minimum strength.

On the other hand, the tread portion (a) of such heavy-duty radial tires is stiffened by belt plies (b) as shown in FIG. 3. Accordingly, between the tread portion and the relatively flexible sidewall portions (c), a large structural rigidity difference occurs, and the carcass cords are liable to break along the boundary portion (d) therebetween as the tire is repeatedly subjected to shocks when the tire runs over obstacles, runs on sidewalks, runs on bumpy roads, for example.

SUMMARY OF THE INVENTION

It is therefore, an object of the present invention to provide a heavy duty radial tire, in which the carcass is minimized while effectively preventing damage of the carcass occurring along the boundaries between the tread portion and sidewall portions.

According to one aspect of the present invention, a heavy duty radial tire comprises a tread portion with a pair of tread edges, the tread portion provided with main grooves having a depth, a pair of sidewall portions in which a maximum tire width point exists, a pair of bead portions defining a bead base line, a portion from the tread edge to the maximum tire width point provided with a profile which is formed by adding at least a protrusion to a basic profile, the basic profile consisting of an upper line and a lower line, the upper line extending radially inwardly from the tread edge and curved concavely so as to have a center of curvature outside the tire, the lower line extending radially outwardly from the maximum tire width point and curved convexly so as to have a center of curvature inside the tire, the upper line and lower line intersecting each other so as to form an inflection point, the radial height of the inflection point from the bead base line being in the range of from 0.82 to 0.88 times a groove bottom line height, the groove bottom line height being the radial height between the bead base line and a groove bottom line drawn parallel with the tread surface at said depth of the main grooves measured at axial ends of the groove bottom line, the protrusion having an apex positioned such that the axial distance measured axially outwardly from the inflection point to the apex is in the range of from 4 to 8 mm, and the radial distance measured between the inflection point and the apex is in the range of from 0 to 5 mm.

DESCRIPTION OF THE PREFERRED EMBODIMENT

An embodiment of the present invention will now be described in detail in conjunction with the accompanying drawings.

Figure 1:
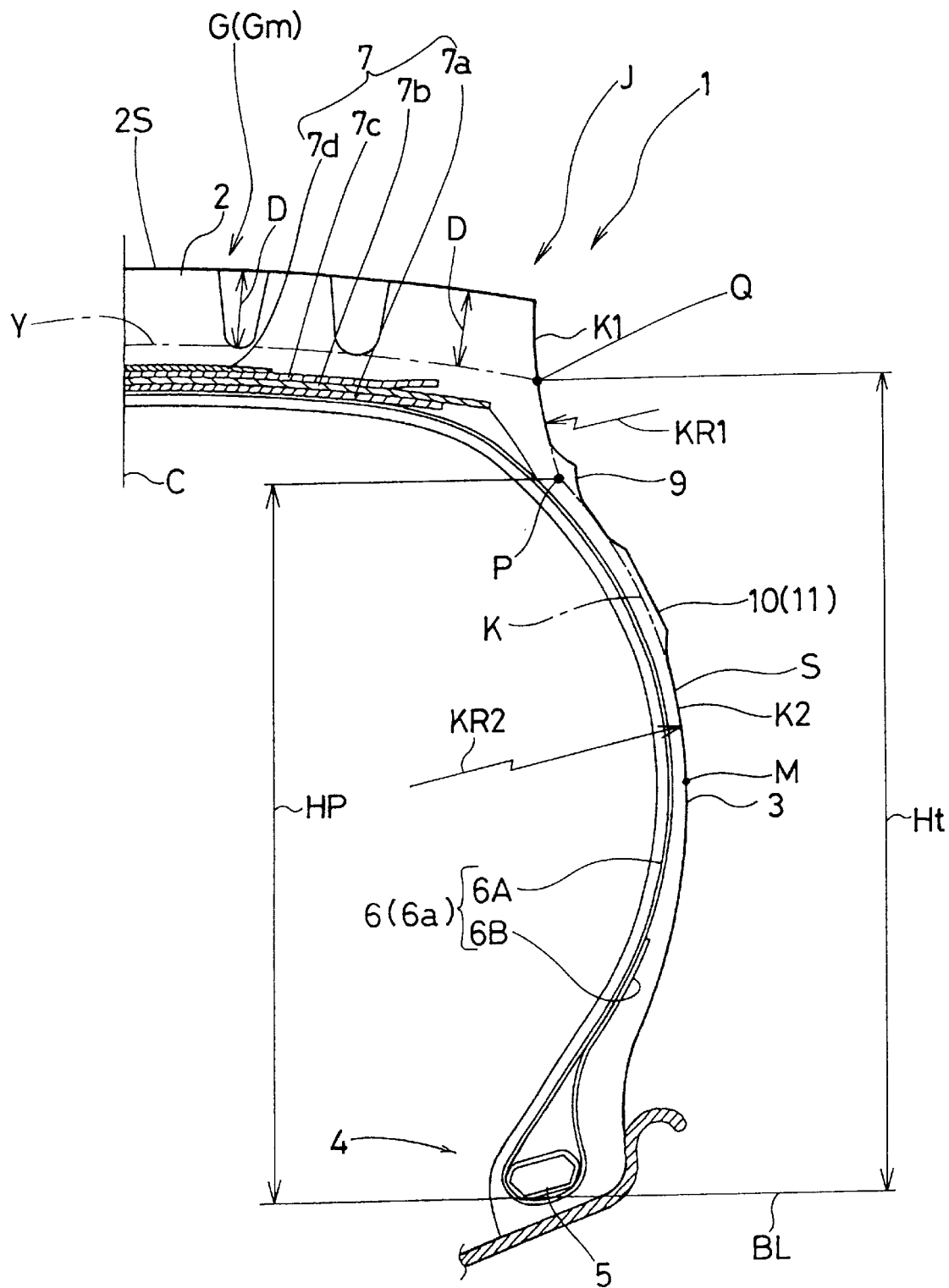
FIG. 1 is a cross sectional view of an embodiment of the present invention.
Figure 2:
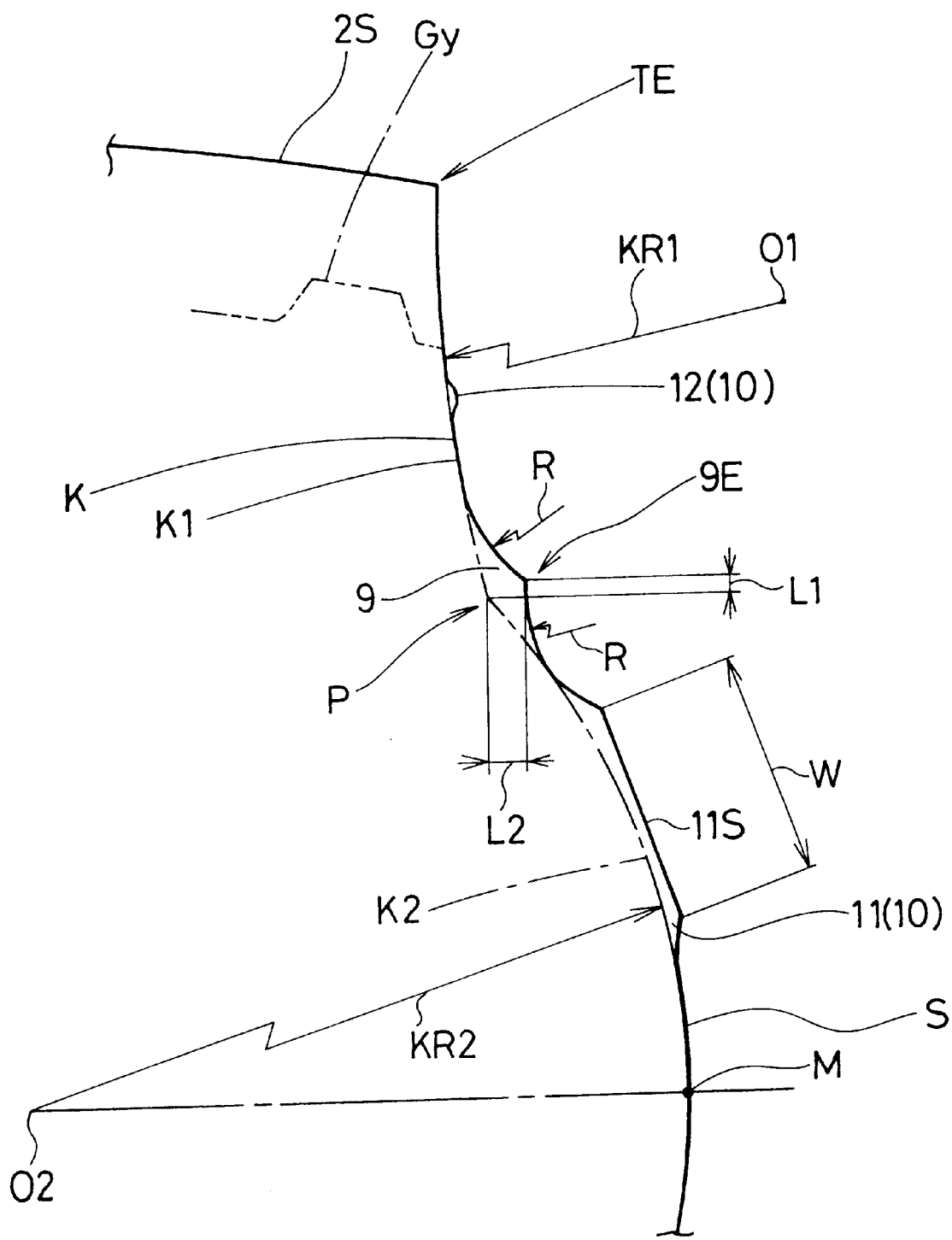
FIG. 2 is a diagram for explaining the basic profile and actual profile of the tire.

In FIGS. 1 and 2, a heavy duty radial tire 1 according to the present invention comprises a tread portion 2, a pair of axially spaced bead portions 4 with a bead core 5 therein, a pair of sidewall portions 3 extending between the tread edges TE and the bead portions 4, a carcass 6 extending between the bead portions 4, and a belt 7 disposed radially outside the carcass 6 in the tread portion 2.

FIG. 1 shows a meridian section of the tire 1 under a normally inflated state in which the tire is mounted on a standard rim and inflated to a standard inner pressure. Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

The carcass 6 comprises at least one ply 6a of cords arranged radially at an angle of 70 to 90 degrees with respect to the tire equator C, extending between the bead portions 4 through the tread portion 2 and sidewall portions 3 and turned up around the bead core 5 in each bead portion 4 from the axially inside to the outside of the tire so as to form a pair of turnup portions 6B and a main portion 6A therebetween. For the carcass cords, steel cords are preferably used, but organic fiber cords, e.g. nylon, rayon, polyester, aromatic polyamide and the like can be used. In this embodiment, the carcass 6 is composed of a single ply 6a of steel cords arranged at substantially 90 degrees with respect to the tire equator C. In order to reduce the tire weight and material cost, the rupture strength of the ply 6a is decreased into a range of from 30000 to 40000 N, preferably 300000 to 36000 N. The rupture strength is defined as the total tensile strength of the cords embedded in 5 cm width of the ply. When the embedded cords are the same strength, the rupture strength of the ply is defined as the product of the tensile strength of a cord and the cord count per 5 cm width. In this embodiment, the cord construction is 3/0.17+7/0.20, and the rupture strength of each cord is 840 N, and the cord count per 5 cm width is 40. Accordingly, the rupture strength of the ply is 33600 N.

The belt 7 comprises at least two cross plies, each made of cords laid parallel with each other. In this embodiment, the belt 7 is composed of a radially innermost first ply 7a of steel cords laid at an angle of from 50 to 70 degrees with respect to the tire equator C, and second, third and fourth plies 7b, 7c and 7d of steel cords laid at an angle of not more than 30 degrees with respect to the tire equator C. In addition to steel cords, organic cords, e.g. nylon, rayon, aromatic polyamide and the like can be used for the belt cords.

The above-mentioned tread portion 2 is provided with main grooves G having a depth D as the deepest groove.

In the present invention, a tire profile S from the tread edges TE to the maximum tire width points M is determined, based on a basic profile K.

The basic profile K consists of an upper line K1 and a lower line K2. The upper line K1 extends radially inwardly from the tread edge TE and curves concavely to have a center O1 outside the tire. The lower line K2 extends radially outwardly from the maximum tire width point M and curves convexly to have a center O2 inside the tire. The upper line K1 intersects the lower line K2 at a point P as an inflection point of the basic profile K. The center O2 of the lower line K2 is positioned on an axial line drawn between the two maximum tire width points M in the sidewall portions 3, and the radius KR2 of curvature thereof is set in the range of from 0.4 to 0.6 times a groove bottom line height Ht. The groove bottom line height Ht is the radial height of a point Q on the tire outer surface measured from the bead base line BL. The point Q is an intersecting point between the tire outer surface and a groove bottom line Y drawn parallel to the tread face line 2S at a depth corresponding to the depth D of the tread main groove G. The radius KR1 of curvature of the upper line K1 is more than the radius KR2 of curvature of the lower line K2, preferably not less than 1.5 times the radius KR2. Usually, the upper limit for the radius KR1 is not more than the radius of curvature of the tread face 2S. The height Hp of the inflection point P measured from the bead base line BL is set in the range of from 0.82 to 0.88 times the groove bottom line height Ht.

Based on this basic profile K, an actual profile is defined as follows:

As shown in FIG. 2, on the axially outside of the point P, a protrusion 9 is formed.

The protrusion 9 has a rhombic cross-sectional shape, which has an apex 9E opposite to the apex formed at the above-mentioned inflection point P. The apex 9E can be spaced apart from the point P radially outwardly or inwardly at most 5 mm, and axially outwardly at least 4 mm but at most 8 mm. Thus, the radially distance L1 between the apex 9E and the point P is not more than 5 mm, and the axial distance L2 therebetween is in the range of form 4 to 8 mm. If the distance L1 is more than 5 mm and/or the distance L2 is less than 4 mm, shocks can not be effectively mitigated and it becomes difficult to prevent the carcass damage. If the distance L2 is more than 8 mm, heat generation increases to decrease the durability, and the carcass weight reduction is nullified.

As to the above-mentioned rhombic shape, the radially inner side which is defined as extending radially inwardly from the apex 9E to the basic profile line K, and the radially outer side which is defined as extending radially outwardly from the apex 9E to the basic profile line K, are curved concavely, and preferably the radius R of each curvature is set in the range of from 10 to 50 mm. If the radius R is less than 10 mm, cracks are liable to occur on the protrusion 9 due to compressive strain. If the radius R is more than 50 mm, heat generation increases and the durability decreases.

Preferably, the protrusion 9 is continuous in the tire circumferential direction, but it may be possible to form protrusions 9 at intervals of less than 20 mm in the tire circumferential direction.

In this embodiment, another protrusion such as a rib 11 is disposed between the above-mentioned protrusion 9 and the maximum tire width point M in each sidewall portion. The rib 11 extends continuously in the tire circumferential direction. The outer surface 11S is substantially flat, and the width W thereof is not less than 20 mm. The thickness between the outer surface 11S and the basic profile line K is in the range of from 2 to 5 mm. The rib 11 disperses shocks and enhances the resistance to carcass damage.

In this embodiment, further, another protrusion such as a small rib 12 is disposed radially outside the protrusion 9. The rib 12 has a triangular cross-sectional shape. The distance of the apex of the triangular shape from the basic profile line K is set in the range of from 2 to 5 mm. The rib 12 is positioned near but radially inside the above-mentioned intersecting point Q so as to reinforce open ends of axial grooves Gy especially to prevent the groove bottom from cracking.

By the formation of the above-mentioned protrusion 9 and ribs 11 and 12, the actual profile S slightly deviates from the basic profile K. It is not preferable to greatly deviate therefrom.

The upper line K1 and the actual profile S accord with each other at least 40%, preferably more than 50% of the upper line K1, and they accord with each other from the tread edge TE to the rib 12 (if the rib 12 is formed) or to the protrusion 9 (if the rib 12 is not formed).

The lower line K2 and the actual profile S accord with each other at least 20%, preferably more than 30% of the lower line K2, and they accord with each other from the maximum tire width point M to the rib 11 (if the rib 11 is formed) or to the protrusion 9 (if the rib 11 is not formed).

Incidentally, the lower line K2 is almost parallel with the outside of the carcass 6. The object profile S and the tread profile 2S intersect each other at an angle of more than 90 degrees but less than about 120 degrees so as to form the so called square shoulder.

Comparison Test

Test tires of size 11R24.5 were prepared, and a running test was made. In the test, trucks provided with test tires were run on a test course including about 10% off-road, and the rate of occurrence of carcass damage was obtained.

The specifications and test results are shown in Table 1.

Form the test, it was confirmed that Example tire could be greatly improved in the resistance to carcass damage in comparison with Reference tire though they had the same ply rupture strength, and the occurrence of carcass damage could be effectively reduced to the substantially same order as the conventional tire having a relatively high ply rupture strength of 43260 N.

TABLE 1

Figure 3:
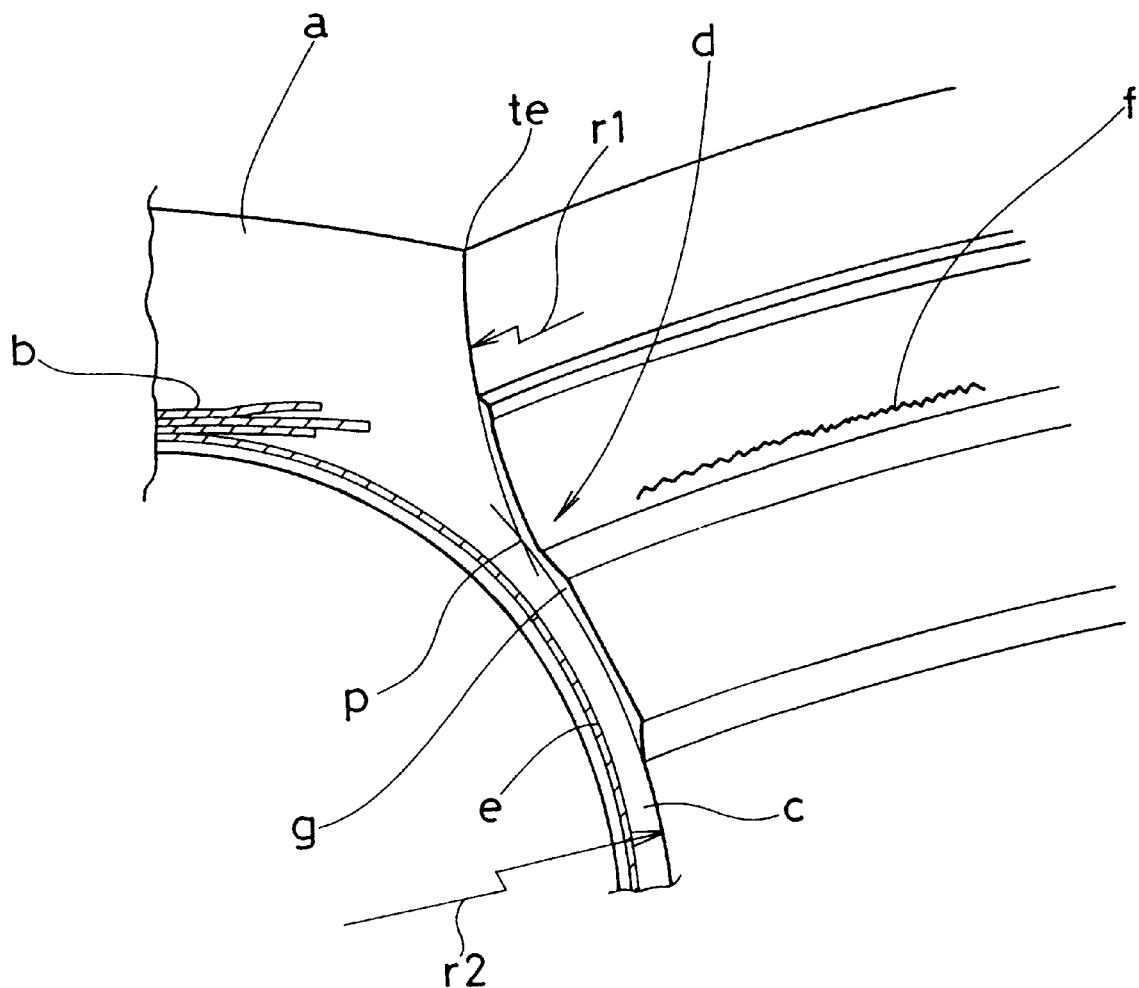
FIG. 3 is a schematic perspective view for explaining the problem, carcass damage, of the conventional tire.

| Tire | Conventional | Reference | Example |
| --- | --- | --- | --- |
| Carcass | 1 ply | 1 ply | 1 ply |
| Cord | 3/0.20+ | 3/0.17+ | 3/0.17+ |
|  | 7/0.23 | 7/0.20 | 7/0.20 |
| Cord count | 38 | 40 | 40 |
| Cord rupture strength (N) | 1139(100%) | 840(74%) | 840(74%) |
| Ply rupture strength (N) | 43282(100%) | 33600(78%) | 33600(78%) |
| Basic Plofile | FIG. 1 | FIG. 1 | FIG. 1 |
| KR1 (mm) | 250 | 250 | 250 |
| KR2 (mm) | 111.6 | 111.6 | 111.6 |
| HP (mm) | 180.6 | 180.6 | 180.6 |
| Ht (mm) | 215.2 | 215.2 | 215.2 |
| Hp/Ht | 0.839 | 0.839 | 0.839 |
| Actual Profile | FIG. 3 | FIG. 3 | FIG. 1 |
| Protrusion 9 | non | non | present |
| L1 (mm) |  |  | 2.05 (outward) |
| L2 (mm) |  |  | 5.5 mm |
| R (mm) |  |  | 20(out) 15(in) |
| Rib *1 | present | present | present |
| W (mm) | — | — | 33 |

TABLE 1-continued

| Tire | Conventional | Reference | Example |
| --- | --- | --- | --- |
| Occurrence of carcass damage (%) | 0.03 | 0.5 | 0.05 |

*1) In Example tire, the rib 11 was provided. In Ref. and Conventional tires, a wide rib extending from a position corresponding to the radially inner end of the rib 11 to a position near the point Q was provided.

What is claimed is:

1. A heavy duty radial tire comprising a tread portion with a pair of tread edges, the tread portion provided with main grooves having a depth, a pair of sidewall portions in which a maximum tire width point exists, a pair of bead portions defining a bead base line, a portion from the tread edge to the maximum tire width point provided with a profile which is formed by adding at least a protrusion to a basic profile, said basic profile consisting of an upper line and a lower line, the upper line extending radially inwardly from the tread edge and curved concavely so as to have a center of curvature outside the tire, the lower line extending radially outwardly from the maximum tire width point and curved convexly so as to have a center of curvature inside the tire, the upper line and lower line intersecting each other so as to form an inflection point, the radial height of the inflection point from the bead base line being in the range of from 0.82 to 0.88 times a groove bottom line height, the groove bottom line height being the radial height between the bead base line and a groove bottom line drawn parallel with the tread surface at said depth of the main grooves measured at axial ends of the groove bottom line, said protrusion having an apex positioned such that the axial distance measured axially outwardly from the inflection point to the apex is in the range of from 4 to 8 mm, and the radial distance measured between the inflection point and the apex is in the range of from 0 to 5 mm.

2. The heavy duty radial tire according to claim 1, wherein the protrusion defines a first concave curve extending radially outwardly from the apex and having a radius of curvature of 10 to 50 mm, and a second concave curve extending radially inwardly from the apex and having a radius of curvature of 10 to 50 mm.

3. The heavy duty radial tire according to claim 1, wherein said portion from the tread edge to the maximum tire width point is provided radially inside or outside said protrusion with a second protrusion.

4. The heavy duty radial tire according to claim 3, wherein said second protrusion is a circumferentially continuously extending rib, the rib having a substantially flat outer surface having a width of not less than 20 mm.

* * * * *